E. G. ARCHER.
DIRECTION INDICATOR FOR ROAD VEHICLES.
APPLICATION FILED JUNE 9, 1919.
1,337,991.
Patented Apr. 27, 1920.
2 SHEETS—SHEET 1.
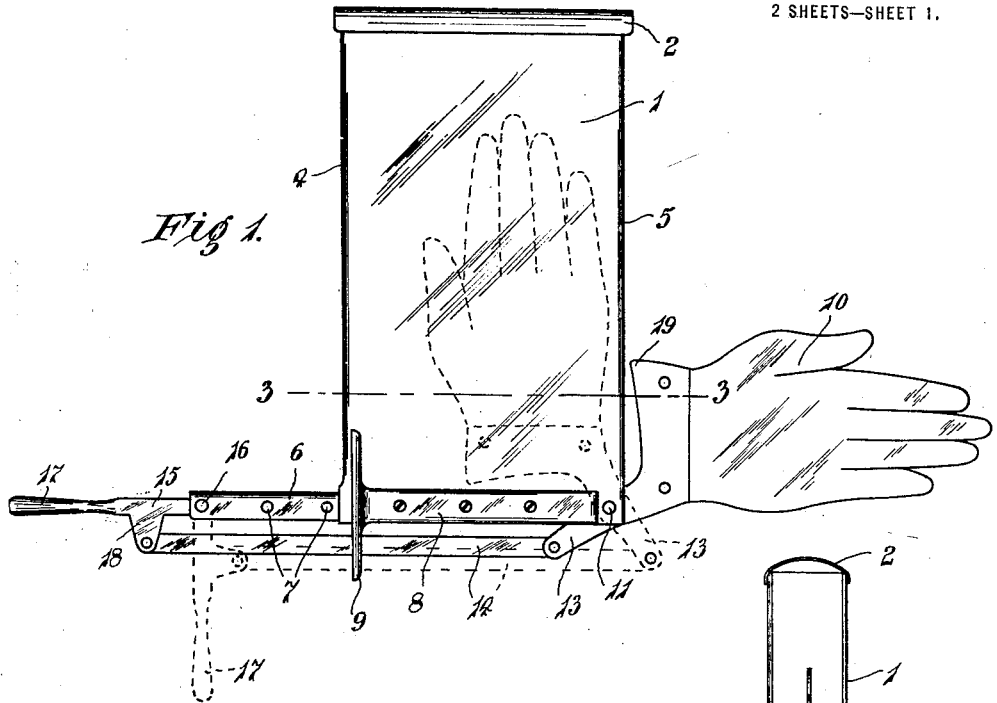
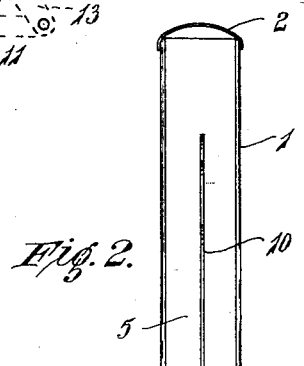
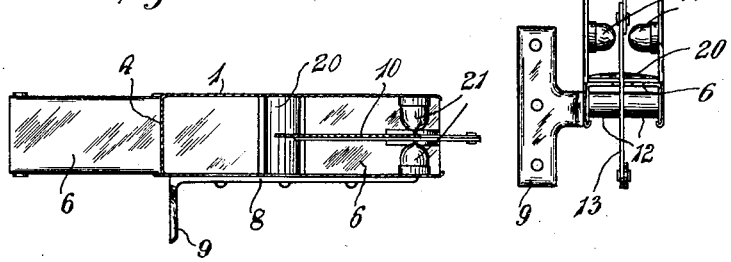

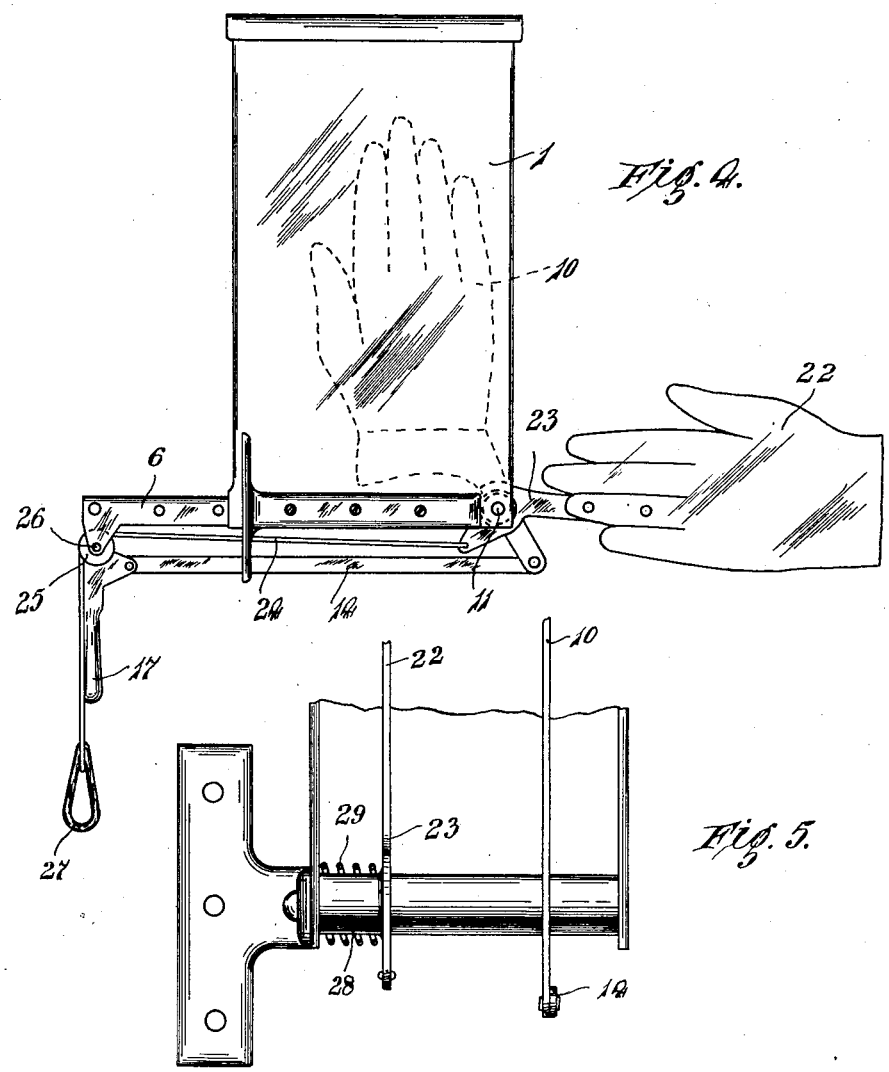

UNITED STATES PATENT OFFICE.

EBENEZER GUEST ARCHER, OF LANGLEY, ENGLAND.

DIRECTION-INDICATOR FOR ROAD-VEHICLES.

1,337,991.  Specification of Letters Patent.  Patented Apr. 27, 1920.

Application filed June 9, 1919. Serial No. 302,790.

*To all whom it may concern:*

Be it known that I, EBENEZER GUEST ARCHER, a subject of the King of Great Britain, residing at 33 Whyley street, Langley, in the county of Worcester, England, have invented certain new and useful Improvements in Direction-Indicators for Road-Vehicles, and I do hereby declare that the following is a full, clear, and exact description of the same.

This invention relates to direction indicators for road vehicles of the kind which includes a casing containing one or more pivoted indicating devices which can be moved so as to project from the casing to indicate the direction of an intended turn by the vehicle or to indicate an intended stoppage, and the object of the present invention is generally to improve the construction of such devices and also to provide a simplified construction.

One object of my invention is to provide means whereby the operating handle for the device will be within easy reach of the driver while the casing containing the actual indicators is adapted to project from the side or top of the vehicle.

A further object of my invention is to provide a reversible attachment means which can be adjusted readily upon the casing or a member associated therewith whereby a standard form of the device will be applicable to either side of a vehicle and to vehicles of different construction.

A further object of my invention is to provide means whereby any tendency to rattle or noise arising from looseness of parts after a period of use will be overcome.

A further object of my invention is to provide a plurality of indicating devices mounted on a common pivot whereby, without unduly complicating the apparatus, the direction of a turn or an intended stop of the vehicle may be indicated.

A further object of my invention in those cases where a plurality of indicators are used is to provide an individual operating member for each indicator, each operating member moving in a different direction and being of a different nature so that it can be recognized by touch. This feature is of considerable value as devices of the kind to which my invention relates are frequently used in emergencies where the driver has no time to look or consider what he is to do. In such cases the driver acts involuntarily and the constant use of a number of operating devices which can be identified by touch is the only way of insuring that in an emergency the right indicator will be operated.

A further object of my invention is to provide means disposed within the casing for returning the indicating member to the casing automatically.

A further object of my invention is to combine with an indicating device, other warning devices such as bells or lights.

Referring to the drawings:—

Figure 1. is a view in side elevation of one form of the device.

Fig. 2. is an end view.

Fig. 3. is a sectional plan on line 3—3 of Fig. 1.

Fig. 4. is a view in side elevation of another form of the device.

Fig. 5. is a fragmentary end view on an enlarged scale of the device shown in Fig. 4.

In the construction illustrated in Figs. 1–3 the device comprises a casing 1 closed at the top 2 and at the side 4. The side 5 of the casing 1 is open. The casing is provided with a bottom 6 which may consist of a piece of sheet metal bent into channel section. This bottom member 6 extends from the edge 5 to a point considerably beyond the edge 4. Each flange of the channel is provided with a series of regularly spaced holes 7 to which is attached by screws or the like an attachment bracket 8.

The attachment bracket 8 may be formed as shown with a flange 9 bent at right angles or it may be formed in any other suitable way. The attachment bracket 8 as will be readily seen from Fig. 1 may be adjusted along the length of the channel member 6. Further, the attachment bracket 8 may be placed on either side of the casing as will be seen clearly from Fig. 2. Thus a device as shown may be attached to either side of a vehicle and the adjustable bracket allows the device to be applied to different parts or different constructions of vehicles with great facility.

The indicating member 10 may be formed as a hand as shown and pivoted to the casing at 11, the pivot being secured to the casing. The hand or indicating member 10 may be made from sheet metal and mounted on the pivot 11 between the two washers 12, one placed on either side of it.

In this construction the indicating member 10 is provided with a projecting arm 13 to which is attached a connecting link 14 connected to a lever 15 pivoted to the arm 6 at 16. The member 15 is provided with a handle 17 and a projecting lug 18 to which the connecting link 14 is pivotally attached.

In operation assuming the parts to be in the positions shown in dotted lines with the indicating member 10 disposed within the casing, a pull on the handle 17 is transmitted directly by the connecting link 14 to the arm 13 causing the indicating member 10 to move on its pivot and occupy the position shown in full lines.

The indicating member 10 is provided with a projecting portion 19 which is adapted, when the parts are in the position shown in dotted lines, to come into contact with a pad 20 of rubber or the like attached to the top of the member 6. A pair of pads 21 of rubber or the like are arranged as shown in Fig. 3, one on either side of the indicator 10, the three pads 20 and 21 insuring that the action will be silent even after a period of use when the parts may have become more or less loose.

Referring to the construction shown in Figs. 4 and 5 the casing is constructed and arranged similarly to the casing described with reference to Figs. 1, 2 and 3 except that it may be wider as shown in Fig. 5. In this construction the casing 1 is adapted to accommodate a pair of indicating members such as 10 and 22 which may be mounted on a common pivot. The member 10 may be mounted and operated in substantially the same manner as described with reference to Figs. 1–3. The member 22, however, is attached to a lever 23 mounted on the pivot 11 and preferably operated by a cord 24 or equivalent mechanism such as Bowden wire mechanism. If a cord such as 24 is used it may be passed over a pulley 25 pivoted to the member 6 at 26 and the end of the cord may be provided with a loop 27.

Referring particularly to Fig. 5 the member 23 may be provided with a boss 28 around which is a coiled spring 29, one end of which is attached to the casing 1 and the other end of which is attached to the member 23, the arrangement being such that this spring tends to keep the member 22 within the casing 1. Should the member 22 be moved into the position shown in Fig. 4 by pulling the loop 27 it will automatically return to the casing upon the loop 27 being released. If the driver desires to keep the member 23 in the position shown in Fig. 4 the loop 27 may be temporarily hung up over a hook or the like upon the vehicle.

One of the features of this form of the device is that the loop 27 is of a different nature from the handle 17 and can be recognized at once by touch. Further, the handle 17 is moved through an upward curve whereas the loop 27 is simply pulled downwardly. In the construction shown in Figs. 4 and 5 the channel plate 6 and attachment bracket 8 may be arranged as shown in Figs. 1, 2 and 3.

If required a third member such as 10 or 22 may be arranged upon the spindle 11, to be projected from the casing by some other form of operating member than the two already described. This third member would preferably take the form of a hand which would occupy a vertical position when projected from the casing 1, this being to indicate a stop of the vehicle.

The construction shown in Figs. 4 and 5 also preferably includes pads such as 20 and 21 for silencing the action.

A bell or electric light may be combined with the device adapted to be sounded or illuminated when the indicating device is operated. For operating a bell or electric light the connecting link 14 or the cord 24 may be provided with a connection either to the bell or to an electric light switch.

A mirror may be combined with the device arranged so that the driver will be able to see what is following him.

What I claim then is:—

1. An indicating device for road vehicles comprising a casing containing at least one pivoted indicating member, a member attached to and projecting from said casing, a series of regularly spaced holes in said member, an attachment bracket, securing members for said bracket said securing members being spaced to correspond with said holes, and indicating member operating means including a handle disposed at the end of said projecting member.

2. An indicating device for road vehicles comprising a casing containing at least one pivoted indicating member, resilient pads in said casing adapted to contact said indicating member to prevent rattling, a member attached to and projecting from said casing, and indicating member operating means including a handle disposed at the end of said projecting member.

3. An indicating device for road vehicles comprising a casing containing at least one pivoted indicating member, resilient pads in said casing adapted to contact said indicating member to prevent rattling, a member attached to and projecting from said casing, a series of regularly spaced holes in said member, an attachment bracket, securing members for said bracket, said securing members being spaced to correspond with said holes, and indicating member operating means including a handle disposed at the end of said projecting member.

4. An indicating device for road wheels, comprising a casing, a plurality of indicating members mounted on a common pivot within said casing; an individual operating member for each indicating member, the operating members being of different natures and moving in a different direction.

5. An indicating device for road wheels, comprising a casing, a plurality of indicating members mounted on a common pivot at one corner of said casing, a projection on each indicating member extending beyond the pivot; a member attached to and projecting beyond the opposite end of the casing to the pivot, individual indicating member operating means on the end of the member, the operating members being of different natures and moving in a different direction; the said operating means being connected to the projection on the indicating member.

6. An indicating device for road wheels, comprising a casing; a plurality of indicating members mounted on a common pivot within said casing, means for operating said indicating members comprising means for operating some positively into and out of the casing and for operating others one way only; a spring disposed around the pivot and connected to those indicating members which are operated in one way only; the operating members being of different natures and moving in a different direction.

In witness whereof I affix my signature.

EBENEZER GUEST ARCHER.